Patented Apr. 24, 1934

1,956,415

UNITED STATES PATENT OFFICE 1,956,415

PROCESS OF SOLUBILIZING COMPOUNDS WHICH ARE DIFFICULTLY SOLUBLE OR INSOLUBLE IN WATER

Karl Dachlauer, Christoph Thomsen, and Arthur Voss, Frankfort-on-the-Main-Hochst, Germany, assignors to I. G. Farbenindustrie Aktiengesellschaft, Frankfort - on - the - Main, Germany, a corporation of Germany No Drawing. Application December 13, 1928, Serial No. 325,907. In Germany December 19, 1927

27 Claims. (Cl. 149—5)

The present invention relates to a new process of solubilizing compounds which are difficultly soluble or insoluble in water.

The object of the invention is the conversion of aromatic compounds containing the hydroxyl group into water soluble products which can be used with special advantage as tanning materials. If it is attempted to obtain the desired solubility in water by dispersing the aromatic compounds containing hydroxyl, these dispersions often show a great tendency to precipitate.

We have made the observation that the great tendency of substances in colloidal dissolution to precipitate, a fact which is very disadvantageous if the substances are to be used for tanning purposes, is due to the insufficient subdivision of the dissolved products in the dispersing agent.

The invention is based upon the newly gained knowledge that the degree of dispersion essentially depends on the concentration and the kind of the dispersing medium used for the dispersion. Sulfonic acids of aromatic hydrocarbons or mixtures thereof have proved to be the most suitable dispersing agents if employed in as high a concentration as possible. As such concentrated fulfonic acids or mixtures thereof may for instance be used products which are obtained in the usual manner in the sulfonation of aromatic hydrocarbons or derivatives thereof by means of a strong sulfonating agent (concentrated sulfuric acid, sulfuric acid containing $SO_3$, chlorosulfonic acid).

In particular those sulfonic acids or mixtures thereof can be employed which are obtained by a simultaneous or successive treatment of aromatic or hydroaromatic hydrocarbons with easily condensable compounds, as for instance aliphatic, aromatic or hydroaromatic alcohols or halogen compounds, containing an easily mobile halogen atom and with any of the above mentioned sulfonating agents. It is also possible directly to use the mixture obtained during the sulfonation from aromatic sulfonic acids and an excess of the sulfonating agent.

It may be useful in some cases to dilute with a little water the dispersing agents before there are added the substances to be dispersed which may be used either alone or mixed with each other; it must, however, be considered that, when adding more than 20–30 per cent of water—according to the kind of the starting material used—the resulting products will prove unsuitable for the purposes of the present process.

It is, nevertheless, essential that the substances to be dispersed be used in as anhydrous a condition as possible; furthermore, it is essential that they be dispersed by the above mentioned sulfonic acids at a raised temperature, preferably between 70° C.–150° C. It is to be understood that the scope of the invention comprises the dispersion of aromatic compounds containing hydroxyl of the most varied origin and composition. When preparing condensation products from aldehydes or agents capable of splitting off aldehydes, and phenols, we have found it advisable to use phenols and aldehydes in a molecular proportion of 2 to 0.8–1.5.

Furthermore, it has proved to be of a special advantage to effect the dispersion of the said condensation products while being in a non-hardened, i. e. in an incompletely condensed state. Thus, by the action of the sulfonic acids in question there occurs a further condensation of the said compounds containing hydroxyl. It is a highly surprising fact that just by this method an excellent and very stable dispersion is accomplished. It is even sufficient if instead of a condensation product there is used a solution of aldehyde in phenol. By the introduction of this solution into the sulfonic acid at a raised temperature condensation occurs.

By observing the conditions which are characteristic for our invention, the substances to be dissolved can be so finely subdivided in the above named dispersing media that no precipitates are formed, either by diluting the solution with water or by adding thereto an acid or a lye. When to be used as a tanning agent the dispersions obtained as discribed above are diluted with water and partly neutralized.

The reaction may also be carried out by adding to the compounds containing hydroxyl any other high molecular indifferent bodies, such as natural resins, synthetic resins, waxes, asphalts, lignine, pitch obtained from sulfite, etc. The said bodies are then dispersed simultaneously with the compounds containing hydroxyl. It is advisable to use also in this case, compounds containing hydroxyl while they are still in an incompletely condensed state.

If the new products are utilized in tannery it is of special importance that they possess in a high degree the property of dissolving phlobaphenes. They are also to some extent suitable for being used as a foaming and emulsifying agent, as resists for dyeing purposes and for the preparation of fungicide and insecticide agents.

When the colloidal solutions obtainable in the above indicated manner are to be used for special purposes, it may be advantageous to work with mixtures of the products prepared according to the present process, to which mixture there may further be added any other suitable substance, for instance synthetic or natural tanning materials, Turkey red oil, etc.

The following examples serve to illustrate our invention but they are not intended to limit it thereto, the parts being parts by weight:

(1) 70 parts of a resin obtained by treating 63 parts of phenol with 17.2 parts of chloracetone at a raised temperature, are slowly introduced in small portions, while well stirring into the sulfonating mixture consisting of 106 parts of tetrahydronaphthalene and 144 parts of sulfuric acid of 98 per cent strength.

The product dissolves clearly in water not only in an acid state, but also when adding a caustic soda solution.

(2) 138 parts of commercial cresol are condensed to a resin with 51 parts of asymmetric dichlorether at a temperature between 90° C. and 100° C. This resin is dispersed in small portions at 100° C., while well stirring, in the sulfonating mixture prepared from 222 parts of tetrahydronaphthalene and 301 parts of sulfuric acid of 98 per cent strength.

With reference to its solubility in water, the product behaves in the same manner as that obtained in Example (1).

(3) 50 parts of crude benzene are run, while stirring, at a temperature of 40° C. to 50° C., into 140 parts of sulfuric acid of 100 per cent strength and the whole is finally heated at 100° C. until the sulfonation is complete. After cooling the mass to 60° C. to 70° C., 26.4 parts of tetrahydronaphthalene are run into the sulfonation mixture while again stirring, whereupon the mass is again heated to 100° C. until the tetrahydronaphthalene has also become water-soluble.

93 parts of a liquid resin are run into the sulfonation mixture at about 90° C.; the said resin being obtained from 2 mol. of phenol and 1 mol. of formaldehyde in the presence of an alkaline condensing agent by slowly heating to about 100° C. until the formaldehyde odor has disappeared and subsequently separating the excess of water by the addition of sodium chloride.

When the product which is clearly soluble in water is to be used as a tanning material, it is neutralized with 181 parts of caustic soda solution of 20 per cent strength. The leather tanned therewith becomes light colored, soft and full-bodied. In using the product for tanning purposes it shows a remarkable power of dissolving phlobaphene when mixed with a vegetable tanning substance as for instance "quebracho".

(4) 78 parts of α-chloronaphthalene are sulfonated at about 130° C. to 150° C. with 122 parts of fuming sulfuric acid of 5 per cent strength.

57 parts of the liquid phenolic resin referred to in Example (3) are then run into the mixture thus obtained at a temperature between 95° C. and 97° C. while well stirring.

In case the product is to be used as a tanning agent, it is so much neutralized with caustic soda solution of 20 per cent strength that about 10 cc. of N caustic soda solution are required for completely neutralizing 10 g. of the final product.

(5) 70 parts of a liquid resin obtained by an alkaline condensation of 2 mol. of phenol and 1.2 mol. of formaldehyde and subsequent separation of the water present by the addition of sodium chloride are introduced, at a temperature of about 95° C., while well stirring, into 200 parts of the sulfonating mixture obtained from 81.5 parts of α-methylnaphthalene and 118.5 parts of sulfuric acid of 98 per cent strength.

When to be used as a tanning material, the product is so much neutralized with caustic soda solution of 20 per cent strength, that 10 cc. of N caustic soda solution are required for completely neutralizing 10 g. of the final product. The leather tanned in this manner feels fine and soft and is of light color.

(6) 108 parts of commercial cresol are subjected, while gradually raising the temperature to 100° C., to a reaction with 50 parts of formaldehyde of 30 per cent strength in the presence of a solution of 30 parts of phosphoric acid in 200 parts of water which solution serves as a condensing agent.

105 parts of the fluid resin so obtained, after having separated therefrom the aqueous layer, are introduced, drop by drop, at 90° C. to 100° C., while well stirring, into 250 parts of the sulfonating mixture obtained as indicated in Example (1) and prepared from tetrahydronaphthalene and sulfuric acid.

The resulting product is easily soluble in water in any dilution and can be employed as a resist in dyeing.

(7) 128 parts of naphthalene are sulfonated at 165° C. with 205 parts of sulfuric acid of 94 per cent strength. A mixture of 148 parts of n-butylalcohol and 200 parts of sulfuric acid of 98 per cent strength is introduced, at 120° C., into the sulfonating product.

After separation of the waste acid, 54 parts of the liquid resin obtainable as indicated in Example (3) from phenol and formaldehyde, are slowly run, at a temperature between 90° C. and 100° C., into 217 parts of the butylated naphthalene-sulfonic acid thus prepared. The resulting product is clearly soluble in water and can, if necessary, after it has been partly or completely neutralized, be used in dyeing.

(8) 150 parts of tetrahydronaphthalene-sulfonic acid, obtained by sulfonating 140 parts of tetrahydronaphthalene with 180 parts of concentrated sulfuric acid, are heated to 70° C. and into the fused mass 70 parts of methylenediphenylether are slowly introduced, while well stirring. As is known, methylenediphenylether becomes very quickly resinous in the presence of an acid. The temperature raises, while the methylenediphenylether is introduced, to 90° C. and is kept at 95° C. to 100° C. until a test gives a clear solution in water.

(9) A solution of 14 parts of paraformaldehyde in a mixture of 40 parts of commercial cresol and 26 parts of phenol (crystallized carbolic acid) which corresponds to the composition of the so-called washed carbolic acid, is introduced, while well stirring, at 90° C. to 95° C., into 150 parts of the crude melt of naphthalene sulfonic acid. The reaction is rather vigorous and accompanied by a rise of the temperature. Therefore, the product is introduced so slowly that the temperature does not rise above 100° C. and that no separation of resin occurs. After both components have mixed to a homogeneous syrup, the mass is still stirred for about one hour, i. e. as long as a test clearly dissolves in water.

(10) 63 parts of the powdered lignine-cresol-compound, obtained as described in German patent specification No. 365,287 by treating pinewood sawdust with cresol to which a little quantity of hydrochloric acid has been added, are introduced at 90° C. to 100° C., while vigorously stirring, into 125 parts of tetrahydronaphthalene sulfonic acid prepared as indicated in Example (8). The mass is stirred for a further short time and then diluted, at about 50° C., with 100 parts of water, whereupon 65 parts of caustic soda solution of 35 per cent strength are introduced. Animal skin treated with this product is converted into a full, brownish-colored leather of a soft feel.

(11) 70 parts of the lignine-cresol product mentioned in Example (10) are dissolved in 55 parts of a liquid product freed from the excess of water and prepared by condensing, at a raised temperature, phenol and formaldehyde (in the mol. proportion of 2:1) in the presence of some sodium carbonate. This solution is introduced at 90° C. to 100° C., while stirring, into 250 parts of tetrahydronaphthalene sulfonic acid, which has been prepared as described in Example (8). The so obtained dark-brown mass is stirred for a further short time and then becomes soluble in water to a clear solution. This solution can be used as a tanning material after proper dilution with water and the addition of 130 parts of caustic soda solution of 35 per cent strength. Skins treated with this solution give a compact, soft leather.

(12) Into 250 parts of a tetrahydronaphthalene-sulfonation mixture obtained as indicated in Example (1) are introduced, while stirring, at a temperature of 90° C. to 100° C., 100 parts of the liquid condensation product, prepared by slowly heating to 75° C., while stirring, 25 parts of crystallized phenol and 75 parts of cresol (see German Pharmacopœia, 4th edition) with 65 parts of formaldehyde solution of 30 per cent strength to which 0.2 parts of sodium carbonate have been added; this mixture is then stirred until the smell of formaldehyde has disappeared therefrom. After having introduced 20 parts of sodium chloride, the aqueous layer is separated and the liquid resin is used for being dispersed by means of tetrahydronaphthalenesulfonic acid. The reaction mass is partly neutralized with 230 parts of caustic soda solution of 20 per cent strength, and the so obtained product, which forms a greenish-brown, partly crystallized mass, can be used as a material for tanning animal skins.

(13) 170 parts of benzylchloride are condensed in the known manner at 90° C. to 130° C. with 185 parts of naphthalene and then sulfonated at a temperature gradually rising from 60° C. to 110° C. with 250 parts of sulfuric acid containing 20 per cent of SO₃ which can be distilled off. 160 parts of a phenol-formaldehyde condensation product prepared as described in Example (3) are run, at a temperature between 90° C. and 100° C., while stirring, into the aforementioned sulfonation mixture. The so obtained reaction mass is partly neutralized at about 50 C. with 410 parts of caustic soda solution of 20 per cent strength. A tanning material by means of which a very light-colored plump leather is obtained, is produced.

In the following claims the term "high molecular indifferent compounds" is to be understood as comprising natural resins, synthetic resins, asphalts, lignine, pitch obtained from sulfite, etc., insofar as they do not contain hydroxylgroups.

We claim:

1. The process of solubilizing nonhardened condensation products from a mononuclear phenol and an aldehyde which are at best difficultly soluble in water which consists in dispersing said condensation products by means of a sulfonic acid of an aromatic hydrocarbon containing at the most 30 percent of water, at a temperature between 70° and 150° C.

2. The process of solubilizing nonhardened condensation products from a mononuclear phenol and formaldehyde which at best are difficultly soluble in water which consists in dispersing said condensation products by means of a sulfonic acid of an aromatic hydrocarbon containing at the most 30 percent of water, at a temperature between 70° and 150° C.

3. The process of solubilizing nonhardened condensation products from a mononuclear phenol and an aldehyde which are at best difficulty soluble in water which consists in dispersing said condensation products in an incompletely condensed state by means of a sulfonic acid of an aromatic hydrocarbon containing at the most 30 per cent of water, at a temperature between 70° and 150° C.

4. The process of solubilizing nonhardened condensation products from a mononuclear phenol and an aldehyde which are at best difficultly soluble in water which consists in dispersing said condensation products in the form of a mixture of a phenol with an aldehyde by means of a sulfonic acid of an aromatic hydrocarbon containing at the most 30 per cent of water, at a temperature between 70° and 150° C.

5. The process of solubilizing nonhardened condensation products from a mononuclear phenol and an aldehyde which are at best difficultly soluble in water which consists in dispersing said condensation products in an incompletely condensed state, and in a mol. proportion of 2:0.8 to 2:1.5, by means of a sulfonic acid of an aromatic hydrocarbon containing at the most 30 percent of water, at a temperature between 70° and 150° C.

6. The process of solubilizing nonhardened condensation products from a mononuclear phenol and an aldehyde which are at best difficultly soluble in water which consists in dispersing said condensation products in an incompletely condensed state, and in a mol. proportion of 2:0.8 to 2:1.5, by means of a sulfonic acid of an aromatic hydrocarbon containing at the most 30 percent of water, at a temperature between 70° and 150° C., while adding lignine.

7. The process which consists in dispersing, by means of a sulfonic acid of an aromatic hydrocarbon containing at the most 30 per cent of water at a temperature between about 70° C. and about 150° C., a phenolic condensation product the phenolic nuclei of which are connected with each other by a carbon bridge, and which is at best difficultly soluble in water.

8. The process which consists in dispersing, by means of a naphthalene sulfonic acid containing at the most 30 per cent of water at a temperature between about 70° C. and about 150° C., a phenolic condensation product the phenolic nuclei of which are connected with each other by a carbon bridge, and which is at best difficultly soluble in water.

9. The process which consists in dispersing, by means of a benzylnaphthalene sulfonic acid containing at the most 30 per cent of water at a temperature between about 70° C. and about 150° C., a phenolic condensation product the phenolic nuclei of which are connected with each other by a carbon bridge, and which is at best difficulty soluble in water.

10. A composition of matter essentially consisting of a phenolic condensation product the phenolic nuclei of which are connected with each other by a carbon bridge and which is at best difficultly soluble in water, this condensation product being dispersed in a sulfonic acid of an aromatic hydrocarbon containing at the most 30 per cent of water.

11. A composition of matter essentially consisting of a phenolic condensation product the phenolic nuclei of which are connected with each other by a carbon bridge and which is at best difficultly soluble in water, this condensation product being dispersed in a naphthalene sulfonic acid containing at the most 30 per cent of water.

12. A composition of matter essentially consisting of a phenolic condensation product the phenolic nuclei of which are connected with each other by a carbon bridge and which is at best difficultly soluble in water, this condensation product being dispersed in a benzylnaphthalene sulfonic acid containing at the most 30 per cent of water.

13. A composition of matter essentially consisting of a non-hardened condensation product of a phenol and an aldehyde, dispersed in a sulfonic acid of an aromatic hydrocarbon containing at the most 30 per cent of water.

14. A composition of matter essentially consisting of a non-hardened condensation product of a phenol and an aldehyde, dispersed in a naphthalene sulfonic acid containing at the most 30 per cent of water.

15. A composition of matter essentially consisting of a non-hardened condensation product of a phenol and an aldehyde, dispersed in a benzylnaphthalene sulfonic acid containing at the most 30 per cent of water.

16. A composition of matter obtainable by first dispersing, by means of a sulfonic acid of an aromatic hydrocarbon containing at the most 30 per cent of water, a phenolic condensation product the phenolic nuclei of which are connected by a carbon bridge and which is at best difficultly soluble in water, and then diluting the dispersion thus obtained with water.

17. A composition of matter obtainable by first dispersing, by means of a naphthalene sulfonic acid containing at the most 30 per cent of water, a phenolic condensation product the phenolic nuclei of which are connected by a carbon bridge and which is at best difficultly soluble in water, and then diluting the dispersion thus obtained with water.

18. A composition of matter obtainable by first dispersing by means of a benzylnaphthalene sulfonic acid containing at the most 30 per cent of water, a phenolic condensation product the phenolic nuclei of which are connected by a carbon bridge and which is at best difficultly soluble in water, and then diluting the dispersion thus obtained with water.

19. A composition of matter obtainable by first dispersing, by means of a sulfonic acid of an aromatic hydrocarbon containing at the most 30 per cent of water a non-hardened condensation product of a phenol and an aldehyde and then diluting the dispersion thus obtained with water.

20. A composition of matter obtainable by first dispersing, by means of a naphthalene sulfonic acid containing at the most 30 per cent of water a non-hardened condensation product of a phenol and an aldehyde and then diluting the dispersion thus obtained with water.

21. A composition of matter obtainable by first dispersing, by means of a benzylnaphthalene sulfonic acid containing at the most 30 per cent of water a non-hardened condensation product of a phenol and an aldehyde and then diluting the dispersion thus obtained with water.

22. A composition of matter obtainable by first dispersing, by means of a sulfonic acid of an aromatic hydrocarbon containing at the most 30 per cent of water a phenolic condensation product the phenolic nuclei of which are connected by a carbon bridge and which is at best difficultly soluble in water, and then diluting the dispersion thus obtained with water and neutralizing it in part.

23. A composition of matter obtainable by first dispersing, by means of a naphthalene sulfonic acid containing at the most 30 per cent of water, a phenolic condensation product the phenolic nuclei of which are connected by a carbon bridge and which is at best difficultly soluble in water, and then diluting the dispersion thus obtained with water and neutralizing it in part.

24. A composition of matter obtainable by first dispersing, by means of a benzylnaphthalene sulfonic acid containing at the most 30 per cent of water, a phenolic condensation product the phenolic nuclei of which are connected by a carbon bridge and which is at best difficultly soluble in water, and then diluting the dispersion thus obtained with water and neutralizing it in part.

25. A composition of matter obtainable by first dispersing, by means of a sulfonic acid of an aromatic hydrocarbon containing at the most 30 per cent of water, a non-hardened condensation product of a phenol and an aldehyde and then diluting the dispersion thus obtained with water and neutralizing it in part.

26. A composition of matter obtainable by first dispersing, by means of a naphthalene sulfonic acid containing at the most 30 per cent of water, a non-hardened condensation product of a phenol and an aldehyde and then diluting the dispersion thus obtained with water and neutralizing it in part.

27. A composition of matter obtainable by first dispersing, by means of a benzylnaphthalene sulfonic acid containing at the most 30 per cent of water, a non-hardened condensation product of a phenol and an aldehyde and then diluting the dispersion thus obtained with water and neutralizing it in part.

KARL DACHLAUER.
CHRISTOPH THOMSEN.
ARTHUR VOSS.